(12) United States Patent
Han et al.

(10) Patent No.: US 11,314,354 B2
(45) Date of Patent: Apr. 26, 2022

(54) TOUCH DRIVING METHOD AND DEVICE, SWITCHING METHOD, TOUCH DEVICE, AND ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenchao Han, Beijing (CN); Wei Sun, Beijing (CN); Lingyun Shi, Beijing (CN); Dong Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 115 days.

(21) Appl. No.: 16/328,841

(22) PCT Filed: Apr. 16, 2018

(86) PCT No.: PCT/CN2018/083235
§ 371 (c)(1),
(2) Date: Feb. 27, 2019

(87) PCT Pub. No.: WO2018/192453
PCT Pub. Date: Oct. 25, 2018

(65) Prior Publication Data
US 2019/0212867 A1 Jul. 11, 2019

(30) Foreign Application Priority Data
Apr. 17, 2017 (CN) .......................... 201710249605.8

(51) Int. Cl.
G06F 3/041 (2006.01)
G06F 1/3234 (2019.01)
G06F 3/044 (2006.01)

(52) U.S. Cl.
CPC ........ *G06F 3/04166* (2019.05); *G06F 1/3265* (2013.01); *G06F 3/0412* (2013.01); *G06F 3/0446* (2019.05)

(58) Field of Classification Search
CPC combination set(s) only.
See application file for complete search history.

(56) References Cited

U.S. PATENT DOCUMENTS 9,158,418 B2 10/2015 Oda et al.
2010/0265199 A1 10/2010 Chen
(Continued)

FOREIGN PATENT DOCUMENTS

CN 101866210 A 10/2010
CN 101930301 A 12/2010
(Continued)

OTHER PUBLICATIONS

International Search Report and Written Opinion in corresponding International Patent Application No. PCT/CN2018/083235 dated Jul. 18, 2018. 15 pages.
(Continued)

*Primary Examiner* — Shaheda A Abdin
(74) *Attorney, Agent, or Firm* — Leason Ellis LLP

(57) ABSTRACT

A touch driving method and device, an operation mode switching method, a touch devices, and an electronic device are provided, the method includes: controlling a driver module to output a first touch detection signal; controlling a selector module to simultaneously transmit the first touch detection signal outputted by the driver module corresponding to the selector module to n touch electrodes connected to
(Continued)

the selector module; detecting whether there is touch input and, when there is the touch input, controlling the driver module to output a second touch detection signal; and controlling the selector module to successively transmit the second touch detection signal outputted by the driver module corresponding to the selector module to the n touch electrodes connected to the selector module.

18 Claims, 4 Drawing Sheets

(56) References Cited

U.S. PATENT DOCUMENTS

| | | | | |
|---|---|---|---|---|
| 2010/0307840 | A1* | 12/2010 | Kobayashi | G06F 3/044 |
| | | | | 178/18.06 |
| 2014/0111472 | A1* | 4/2014 | Lee | G06F 3/041 |
| | | | | 345/174 |
| 2014/0145985 | A1* | 5/2014 | Akai | G06F 3/0412 |
| | | | | 345/173 |
| 2014/0176483 | A1 | 6/2014 | Lee | |
| 2014/0347316 | A1* | 11/2014 | Yeh | G06F 3/044 |
| | | | | 345/174 |
| 2015/0062062 | A1* | 3/2015 | Han | G06F 3/044 |
| | | | | 345/174 |
| 2016/0034060 | A1* | 2/2016 | Lin | G02F 1/13338 |
| | | | | 345/173 |
| 2016/0077667 | A1 | 3/2016 | Chiang et al. | |
| 2016/0357315 | A1 | 12/2016 | Huang et al. | |
| 2017/0090615 | A1* | 3/2017 | Bohannon | G06F 3/044 |
| 2017/0153736 | A1* | 6/2017 | Kim | G06F 3/0443 |
| 2019/0212867 | A1 | 7/2019 | Han et al. | |

FOREIGN PATENT DOCUMENTS

| | | |
|---|---|---|
| CN | 103164086 A | 6/2013 |
| CN | 103336592 A | 10/2013 |
| CN | 104182071 A | 12/2014 |
| CN | 104850417 A | 8/2015 |
| CN | 105573535 A | 5/2016 |
| CN | 106055149 A | 10/2016 |
| CN | 106527800 A | 3/2017 |
| CN | 107037927 A | 8/2017 |

OTHER PUBLICATIONS

Chinese Office Action in corresponding Chinese Application No. 201710249605.8 dated Mar. 1, 2019 (an English translation attached hereto). 15 pages.

Chinese Office Action in corresponding Chinese Application No. 201710249605.8 dated May 15, 2019 (an English translation attached hereto). 14 pages.

* cited by examiner

TOUCH DRIVING METHOD AND DEVICE, SWITCHING METHOD, TOUCH DEVICE, AND ELECTRONIC DEVICE

CROSS-REFERENCE TO RELATED APPLICATIONS

This application is a U.S. National Stage Application under 35 U.S.C. § 371 of International Patent Application No. PCT/CN2018/083235, filed Apr. 16, 2018, which claims the benefit of priority to Chinese patent application No. 201710249605.8 filed on Apr. 17, 2017, both of which are incorporated by reference in their entireties as a part of the present application.

TECHNICAL FIELD

Embodiments of the present disclosure relate to a touch driving method, a touch driver device, an operation mode switching method, a touch device and an electronic device.

BACKGROUND

In recent years, portable electronic devices such as mobile phones, e-books and tablet computers have been widely used, and the portable electronic devices are also continuously developing toward a more portable and smarter direction.

On the one hand, because the portable electronic devices are developing toward a more portable direction, batteries of the portable electronic devices are designed to be smaller in volume and lighter in weight. The reduced volume and weight of the battery make the portable electronic device lighter and also continuously reduce the charge of the portable electronic device. On the other hand, the touch control technology, as an input means, is not only convenient but also more intuitive in operation than keyboard or mouse input. Therefore, a touch input means has become a popular human-computer interaction method.

In the touch display technology, a touch circuit is generally driven by a time-sharing driving method. For example, in the touch display technology, one frame time is divided into a display period and a touch control period; a common voltage signal is supplied to an electrode layer during the display period; and a touch driving signal is provided to the electrode layer during the touch control period, and the driving signal of touch electrodes is provided by an external touch driver chip through emission electrodes disposed in a sealing area.

SUMMARY

Embodiments of the present disclosure provide a touch driving method, a touch driver device, an operation mode switching method, a touch device and an electronic device, so as to reduce power consumption of the electronic device.

In a first aspect, at least one embodiment of the present disclosure provides a touch driving method which includes: controlling a driver module to output a first touch detection signal; controlling a selector module connected with the driver module to simultaneously transmit the first touch detection signal outputted by the driver module to n touch electrodes connected with the selector module, wherein n is an integer and n>1; detecting whether touch input exists or not; and in presence of a detection result that the touch input exists, controlling the driver module to output a second touch detection signal, and controlling the selector module to successively transmit the second touch detection signal outputted by the driver module to the n touch electrodes.

For example, each driver module of m driver modules is controlled to output the first touch detection signal; each selector module of m selector modules connected with the m driver modules in one-to-one correspondence is controlled to simultaneously transmit the first touch detection signal outputted by a corresponding one of the m driver modules to the n touch electrodes connected with the selector module, wherein m is an integer and m>1; and in presence of the detection result that the touch input exists, each driver module of the m driver modules is controlled to output the second touch detection signal, and each selector module is controlled to successively transmit the second touch detection signal outputted by the corresponding one of the m driver modules to the n touch electrodes corresponding to the selector module.

For example, the n touch electrodes connected with a same one of the selector modules are arranged in a same column and respectively arranged in different rows.

For example, the m selector modules are simultaneously controlled to respectively transmit the first touch detection signal to the touch electrodes that the m selector modules correspond to; and in presence of the detection result that the touch input exists, the m selector modules are simultaneously controlled to respectively and successively transmit the second touch detection signal to the touch electrodes that the m selector modules correspond to.

For example, a time duration within which the driver module outputs the first touch detection signal is a first time duration; a time duration within which the driver module outputs the second touch detection signal is a second time duration, and the first time duration is less than the second time duration.

For example, the second time duration is divided into n periods; the selector module is controlled to transmit the second touch detection signal outputted by the driver module corresponding to the selector module to one of the n touch electrodes corresponding to the selector module in each one of the n periods, and the touch electrodes to which the selector module transmits the second touch detection signal respectively in the n periods are different.

For example, the driver module outputs the first touch detection signal with the first time duration, and a voltage of the first touch detection signal is a first voltage; the driver module outputs the second touch detection signal with the second time duration, and a voltage of the second touch detection signal is a second voltage; and the first voltage is less than the second voltage.

For example, in a standby mode, the driver module is controlled to output the first touch detection signal, and the selector module is controlled to simultaneously transmit the first touch detection signal to the n touch electrodes connected with the selector module.

For example, in a normal operation mode, the driver module is controlled to output the second touch detection signal, and the selector module is controlled to successively transmit the second touch detection signal outputted by the driver module corresponding to the selector module to the n touch electrodes corresponding to the selector module.

For example, the touch driving method further includes: controlling a normal operation mode to include a display mode and a touch display mode; allowing the display mode to include the controlling the driver module to output the first touch detection signal and the controlling the selector module to simultaneously transmit the first touch detection signal to the n touch electrodes connected with the selector module; and allowing the touch display mode to include the controlling the driver module to output the second touch detection signal and the controlling the selector module to successively transmit the second touch detection signal outputted by the driver module corresponding to the selector module to the n touch electrodes corresponding to the selector module.

In a second aspect, at least one embodiment of the present disclosure provides an operation mode switching method which includes: in a first operation mode, simultaneously transmitting a first touch detection signal to n touch electrodes connected with a selector module, wherein n is an integer and n>1; and in presence of a detection result that touch input exists, switching to a second operation mode different from the first operation mode.

For example, in the second operation mode, the selector module is controlled to successively transmit the second touch detection signal to the n touch electrodes.

In a third aspect, at least one embodiment of the present disclosure provides a touch device, the touch device includes m driver modules, m selector modules and a plurality of touch electrodes, the m driver modules are connected with the m selector modules in one-to-one correspondence; each selector module among the m selector modules includes n electrical connection paths, the n electrical connection paths respectively correspond to n touch electrodes among the plurality of touch electrodes, the n touch electrodes are arranged in a same column and respectively disposed in different rows; and both m and n are an integer and greater than 1.

In a fourth aspect, at least one embodiment of the present disclosure further provides a touch driver device, which includes: a driver module; a selector module connected with the driver module; n touch electrodes connected with the selector module; a controller unit configured to control the driver module to output a first touch detection signal and control the selector module connected with the driver module to simultaneously transmit the first touch detection signal outputted by the driver module corresponding to the selector module to the n touch electrodes connected with the selector module; and a detector unit configured to detect whether touch input exists or not, wherein in presence of a detection result of the detector unit being that the touch input exists, the controller unit is further configured to control the driver module to output a second touch detection signal and control the selector module to successively transmit the second touch detection signal outputted by the driver module corresponding to the selector module to the n touch electrodes corresponding to the selector module.

For example, a time duration within which the driver module outputs the first touch detection signal is a first time duration; a time duration within which the driver module outputs the second touch detection signal is a second time duration; and the first time duration is less than the second time duration.

For example, the controller unit is configured to: divide the second time duration into n periods; and control the selector module to transmit the second touch detection signal outputted by the driver module corresponding to the selector module to one of the n touch electrodes connected with the selector module in each of the n period, wherein the touch electrodes to which the selector module transmits the second touch detection signal respectively in the n periods are different.

For example, the controller unit is further configured to control the normal operation mode to include a display mode and a touch display mode, wherein in the display mode, the controller unit is configured to control the driver module to output the first touch detection signal and control the selector module to simultaneously transmit the first touch detection signal to the n touch electrodes connected with the selector module; and in the touch display mode, the controller unit is configured to control the driver module to output the second touch detection signal and control the selector module to successively transmit the second touch detection signal outputted by the driver module corresponding to the selector module to the n touch electrodes corresponding to the selector module.

For example, the controller unit is further configured to control the driver module to output the second touch detection signal and control the selector module to successively transmit the second touch detection signal outputted by the driver module corresponding to the selector module to the n touch electrodes corresponding to the selector module, in a normal operation mode.

For example, the driver module outputs the first touch detection signal with the first time duration, and a voltage of the first touch detection signal is a first voltage; the driver module outputs the second touch detection signal with the second time duration, and a voltage of the second touch detection signal is a second voltage; and the first voltage is less than the second voltage.

For example, the driver module is an active front end; and the selector module is a multiplexer.

In a fifth aspect, at least one embodiment of the present disclosure provides an electronic device, including the touch device provided in any one of the embodiments in the third aspect, or the touch driver device provided in any one of the embodiments in the fourth aspect.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
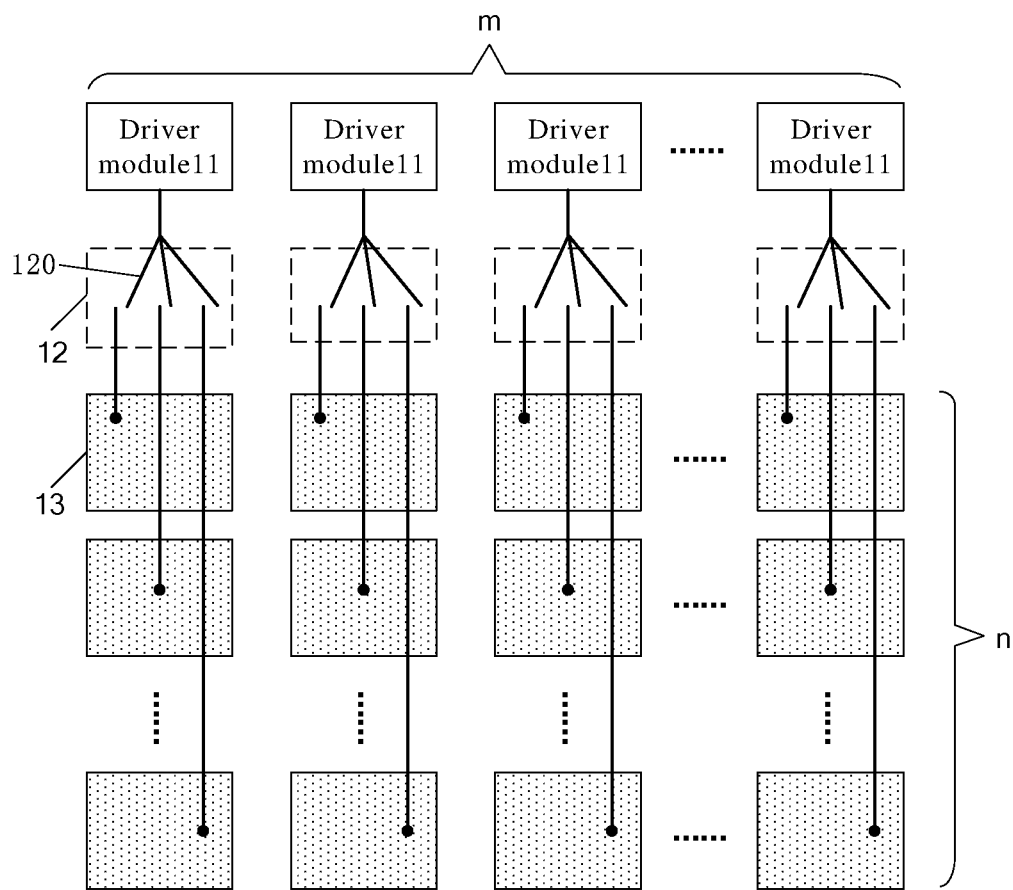
FIG. 1 is a schematic structural view 1 of an electronic device provided by the embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

On the basis of touch control technology, a gesture wake-up function is further developed for the portable electronic device, that is, when the portable electronic device is in a standby mode (sleep mode), a user can switch the portable electronic device to a normal operation mode through the touch input of a certain gesture.

The inventors of the application has noticed in the study that: in order to detect the touch operation inputted by the user in the standby mode of the electronic device, the electronic device outputs touch driving signals in the standby mode, so as to detect whether the user has touch input, which results in large power consumption.

Embodiments of the present disclosure provide a touch driving method, a touch driver device, an operation mode switching method, a touch device and an electronic device. Moreover, the overall design principle of the embodiments of the present disclosure is that: in a situation where the electronic device is in a boot-up state and in a first operation mode, a touch driver module is controlled to simultaneously scan a plurality of touch electrodes in the electronic device; in presence of a detection result that touch input exists (namely in presence of a detection result that the electronic device is touched), the first operation mode is promptly switched into the second operation mode; and because the touch electrodes are simultaneously scanned in the situation where the electronic device is in the first operation mode, a touch scanning time duration in the first operation mode of the electronic device is shortened, and a power consumption of a touch circuit in the first operation mode is also reduced.

For instance, in the first operation mode and the second operation mode of the electronic device, the touch electrodes in the electronic device adopt a same scanning manner, namely the touch electrodes are simultaneously scanned (this touch control mode is hereafter referred to as a first touch mode); or in the first operation mode and the second operation mode of the electronic device, the touch electrodes in the electronic device adopt different scanning manners, for instance, the touch electrodes are simultaneously scanned in the first operation mode (namely the first touch mode) and are subjected to time-sharing scanning in the second operation mode, namely the touch electrodes are successively scanned (hereafter referred to as the second touch mode) in the second operation mode.

In the first touch mode, the plurality of touch electrodes are simultaneously scanned, so whether the touch input exists or not can be determined; and in the second touch mode, the plurality of touch electrodes are subjected to the time-sharing scanning, so a horizontal coordinate and a vertical coordinate of a touch position can be determined, and then the touch operation can be realized.

For instance, the first operation mode is the standby mode and the second operation mode is the normal operation mode (namely the electronic device is in the boot-up state and in a non-standby mode). In this case, the embodiments of the present disclosure can shorten the touch scanning time duration in the standby mode and then reduce the power consumption of the touch circuit in the standby mode. For instance, the normal operation mode includes a display mode adopting the first touch mode and a touch display mode adopting the second touch mode.

For instance, the first operation mode is the display mode in the normal operation mode, and the second operation mode is the touch display mode in the normal operation mode. In a situation where the user adopts the display mode for a long time, the embodiments of the present disclosure can reduce the power consumption of the touch circuit in the display mode by allowing the first operation mode to be the display mode.

For instance, the first operation mode is the standby mode, and the second operation mode is the display mode in the normal operation mode. In this case, the embodiments of the present disclosure can shorten the touch scanning time duration in the standby mode and then reduce the power consumption of the touch circuit in the standby mode.

At least one embodiment of the present disclosure provides the touch driving method, which includes: controlling a driver module to output a first touch detection signal; controlling a selector module connected with the driver module to simultaneously transmit the first touch detection signal outputted by the driver module to n (n is an integer and n>1) touch electrodes connected with the selector module; detecting whether touch input exists or not; and in presence of the detection result that the touch input exists, controlling the driver module to output a second touch detection signal, and controlling the selector module to successively transmit the second touch detection signal outputted by the driver module to the n touch electrodes corresponding to the selector module. The touch driving method provided by the embodiments of the present disclosure is used for switching the first touch mode to the second touch mode.

For instance, in the case where m driver modules and m selector modules are provided, each driver module of the m driver modules is controlled to output the first touch detection signal; each selector module of the m selector modules connected with the m driver modules in one-to-one correspondence is controlled to simultaneously transmit the first touch detection signal outputted by a corresponding driver module to the n touch electrodes connected with the selector module, in which m is an integer and m>1; whether the touch input exists or not is detected; and in presence of the detection result that the touch input exists, each driver module of the m driver modules is controlled to output the second touch detection signal, and each selector module is controlled to successively (namely in sequence) transmit the second touch detection signal outputted by the corresponding driver module to the n touch electrodes corresponding to the selector module.

In the case where the m driver modules and the m selector modules are provided, there are m*n touch electrodes in total, for instance, the touch electrodes are arranged in m columns and n rows. For instance, the n touch electrodes connected with the same selector module are arranged in the same column and respectively disposed in different rows (namely each row is provided with one of the n touch electrodes).

For instance, in the case where the m driver modules and the m selector modules are provided, the m selector modules are simultaneously controlled to respectively transmit the first touch detection signal to corresponding touch electrodes, that is, the m selector modules simultaneously transmit the first touch detection signal to corresponding touch electrodes, and each touch electrode only receives the first touch detection signal transmitted by one selector module; and in presence of the detection result that the touch input exists, the m selector modules are simultaneously controlled to respectively and successively transmit the second touch detection signal to corresponding touch electrodes, that is, each selector module only transmits the second touch detection signal to one touch electrode at the same moment, and the m selector modules simultaneously transmit the second touch detection signal to corresponding touch electrodes.

For instance, a time duration within which the driver module outputs the first touch detection signal is a first time duration; a time duration within which the driver module outputs the second touch detection signal is a second time duration; and the first time duration is less than the second time duration. Because the selector module applies the second touch detection signal to the n touch electrodes corresponding to the selector module one by one (not applied simultaneously), the second time duration is a sum of time durations within which the n touch electrodes are applied with the second touch detection signal respectively. For instance, the time duration within which each of the n touch electrodes is applied with the second touch detection signal is equal to the first time duration, and the second time duration is n times the first time duration.

Detailed description will be given below to the touch driving method provided by the embodiments of the present disclosure with reference to the accompanying drawings.

The embodiments of the present disclosure provide the touch driving method, which is used for the touch driving of the electronic device. For instance, as shown in FIG. 1, the electronic device includes: the m driver modules 11, the m selector modules 12 and the plurality of touch electrodes 13; the m driver modules 11 are connected with the m selector modules 12 in one-to-one correspondence, namely each driver module 11 is connected with one selector module 12 and each selector module 12 is connected with one driver module 11; and each selector module 12 corresponds to n (for instance, n is greater than or equal to 2) touch electrodes 13. For instance, each touch electrode 13 only corresponds to one selector module 12.

For instance, each selector module 12 includes n electrical connection paths 120 (e.g., switches); the n electrical connection paths are in one-to-one correspondence with the n touch electrodes 13; and in a situation where each electrical connection path is switched on (FIG. 1 shows that each electrical connection path is not switched on, for example), the electrical connection path 120 electrically connects the selector module 12 and the touch electrode 13 corresponding to the electrical connection path 120

As known from the above description, the touch electrodes 13 in the embodiments of the present disclosure are arranged in an array, and the number of the touch electrodes is m*n.

For instance, the driver module 11 in the embodiments of the present disclosure may be an active front end (abbreviated as AFE); and the selector module 12 may be a multiplexer (abbreviated as Mux).

Illustratively, in a situation where the electronic device is a liquid crystal display (abbreviated as LCD), a common electrode layer included by a liquid crystal display panel of the liquid crystal display can be divided and used as the touch electrodes. In the case where the liquid crystal display is in the normal display mode, a common voltage is applied to the common electrode layer of the liquid crystal display panel; and in the case where touch detection is performed by the liquid crystal display, touch driving signals are applied to the common electrode layer used as drive electrodes.

Illustratively, in a situation where the electronic device is an organic light-emitting diode (abbreviated as OLED), a cathode layer of the OLED can be divided and used as the touch electrodes; a metal layer at a thin-film transistor (abbreviated as TFT) area below the cathode layer is manufactured into conducting wires; and touch driving signals are transmitted to the cathode layer used as the touch electrodes through the conducting wires, respectively.

For instance, in the electronic device, the touch electrodes may be independently manufactured, but the independent forming of the touch electrodes can increase the manufacturing processes of the electronic device and the thickness of the electronic device, so an electrode originally included by the electronic device is preferably divided and used as the touch electrodes.

Figure 2:
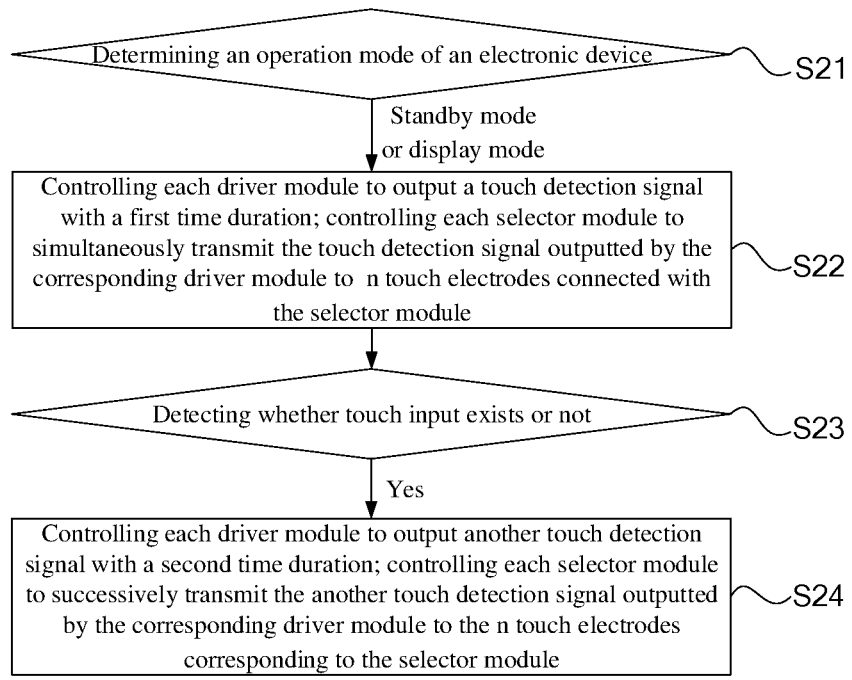
FIG. 2 is a flowchart 1 of a touch driving method provided by the embodiments of the present disclosure.

For instance, as shown in FIG. 2, the touch driving method provided by the embodiments of the present disclosure includes the following steps S21 to S24.

S21: determining the operation mode of the electronic device.

In the step S21, if the electronic device adopts the first operation mode (for instance, the standby mode or the display mode in the normal operation mode), the step S22 is executed.

S22: controlling each driver module to output the first touch detection signal with the first time duration; and controlling each selector module to simultaneously transmit the first touch detection signal outputted by the corresponding driver module to the n touch electrodes connected with the selector module.

For instance, in the step S22, the selector module is electrically connected with each of the n touch electrodes corresponding to the selector module.

Figure 3:
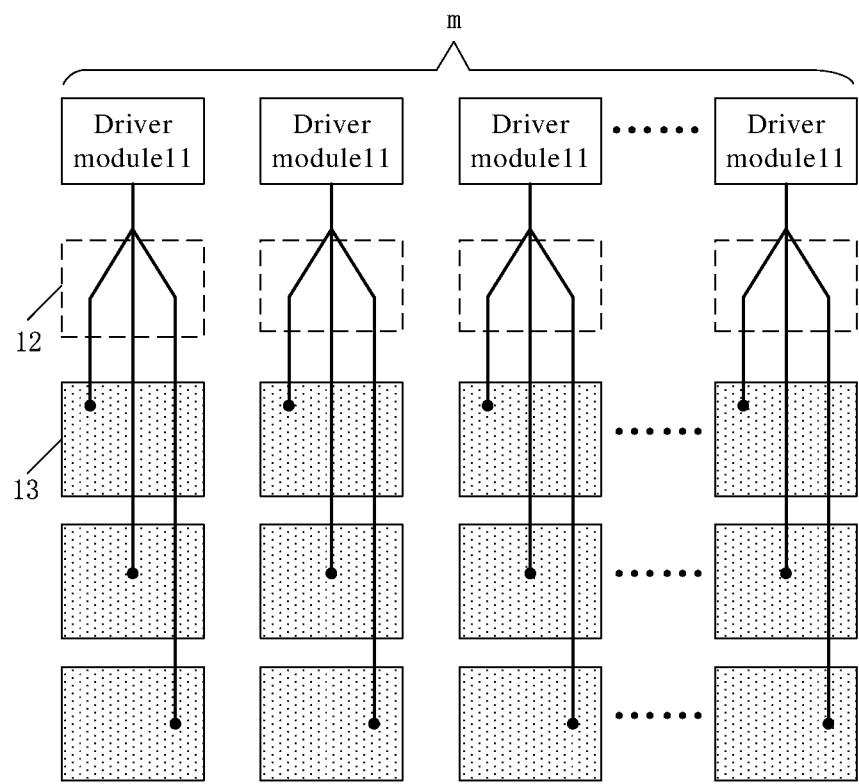
FIG. 3 is a schematic structural view 2 of the electronic device provided by the embodiments of the present disclosure.

Illustratively, as shown in FIG. 3, the embodiment of the present disclosure is described in FIG. 3 by taking the case that n is equal to 3 as an example. In the step S22, the electronic device adopts the first touch mode. In this case, the selector module 12 is simultaneously conducted with 3 touch electrodes 13 within the first time duration (at this point, 3 electrical connection paths of the selector module 12 are all in an on state), so as to simultaneously transmit the first touch detection signal outputted by the driver module 11 to the 3 touch electrodes 13 connected with the selector module 12.

S23: detecting whether the touch input exists or not.

Because the first touch detection signal is transmitted to the touch electrodes 13 in the step S22, whether the touch input exists or not can be detected by detecting the variation of signals (e.g., voltage signals) of the touch electrodes 13.

It should be noted that in the step S22, the selector module 12 simultaneously transmits the first touch detection signal outputted by the driver module 11 to the n touch electrodes 13 connected with the selector module 12, and the touch electrodes disposed in the same column are usually connected with a same detection wire, so although whether the touch input exists or not can be detected through the variation of the voltage signals of the touch electrodes, the position of the touch input cannot be positioned.

In the step S23, if it is detected that the touch input exists, the step S24 is executed.

S24: controlling each driver module to output the second touch detection signal with the second time duration; and controlling each selector module to successively transmit the second touch detection signal outputted by corresponding driver module to the n touch electrodes corresponding to the selector module, that is, the selector module is only conducted with one touch electrode among the n touch electrodes corresponding to the selector module at the same moment within the second time duration and transmits the second touch detection signal to the touch electrode. In the step S24, the electronic device adopts the second touch mode.

Figure 4:
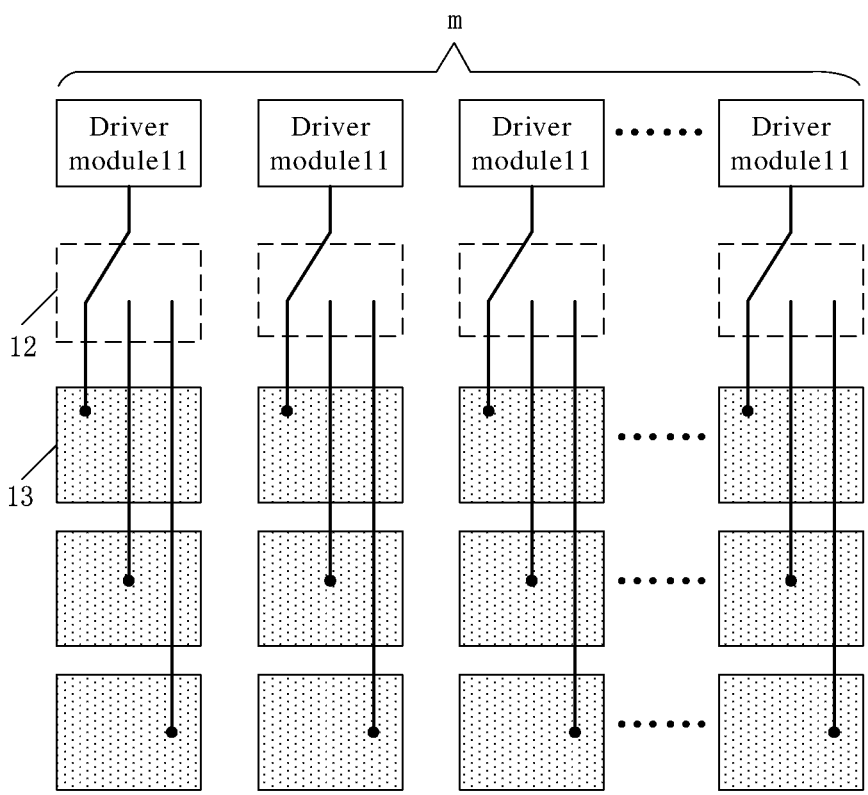
FIG. 4 is a schematic structural view 3 of the electronic device provided by the embodiments of the present disclosure.

Illustratively, as shown in FIG. 4, the embodiment of the present disclosure is described in FIG. 4 by taking the case that n is equal to 3 as an example. In the step S24, after the electronic device is detected to exist the touch input, the selector module 12 is successively conducted with 3 touch electrodes 13 within the second time duration (description is given in FIG. 4 by taking the case that the selector module is connected with the first touch electrode as an example), so as to successively transmit the second touch detection signal outputted by the corresponding driver module 11 to the 3 touch electrodes corresponding to the selector module 12.

In the above embodiments, the first time duration is less than the second time duration. For instance, the second time duration may be n times (e.g., 3 times) the first time duration. In this case, a ratio of the second time duration to the first time duration is equal to the number of the touch electrodes corresponding to each selector module 12.

Moreover, in the step S23, the selector module successively transmits the second touch detection signal outputted by corresponding driver module to the n touch electrodes corresponding to the selector module, so the position of the touch input can be determined at this point according to the detected signal variation (e.g., voltage variation) and the timing sequence of driving signals (e.g., driving voltages) of the drive electrodes.

In the touch driving method provided by the embodiments of the present disclosure, in the first touch mode, each driver module is controlled to output the first touch detection signal with the first time duration, and each selector module is controlled to simultaneously transmit the first touch detection signal with the first time duration outputted by corresponding driver module to the n touch electrodes corresponding to the selector module; and in presence of the detection result that the touch input exists, each driver module is controlled to output the second touch detection signal with the second time duration, and each selector module is controlled to successively transmit the second touch detection signal outputted by corresponding driver module to the n touch electrodes corresponding to the selector module. In the touch driving method provided by the embodiments of the present disclosure, in the first touch mode and in the case of no touch input, each driver module is controlled to output the first touch detection signal with the first time duration; in presence of the touch input, each driver module is controlled to output the second touch detection signal with the second time duration; and the first time duration is less than the second time duration. Therefore, the embodiments of the present disclosure can shorten the time duration within which the driver module outputs the first touch detection signal in the first touch mode and in the case of no touch input, and then reduce the power consumption of the electronic device.

Figure 5:
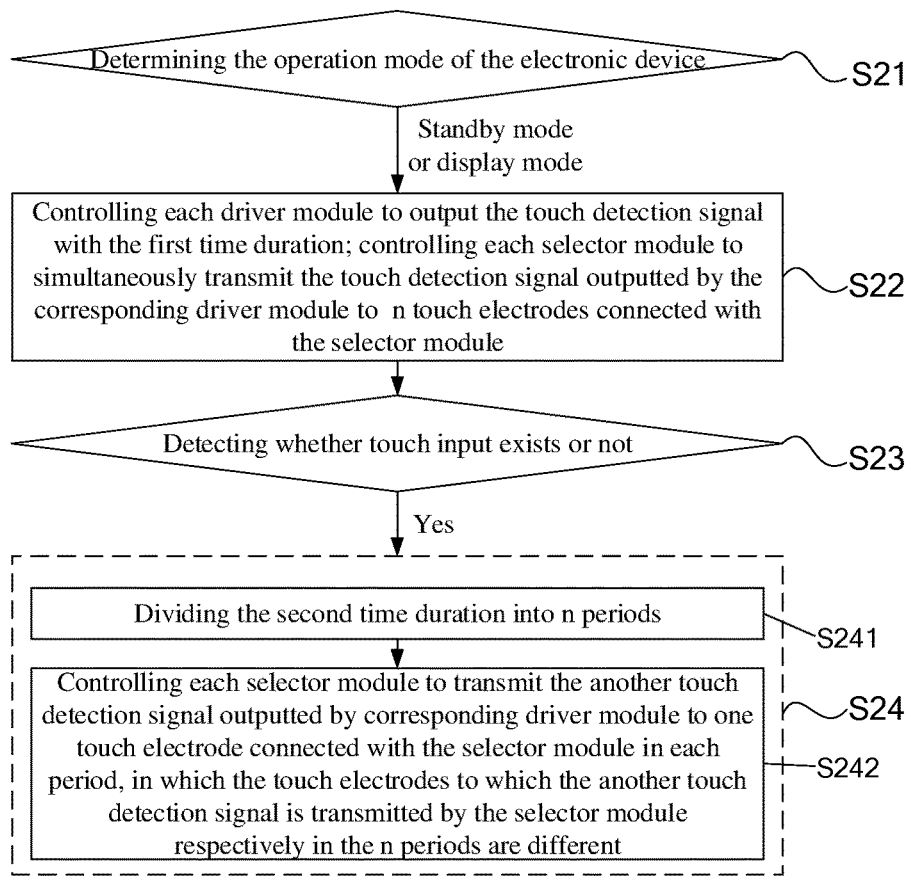
FIG. 5 is a flowchart 2 of the touch driving method provided by the embodiments of the present disclosure.

For instance, as shown in FIG. 5, the step of controlling each driver module to output the second touch detection signal with the second time duration and controlling each selector module to successively transmit the second touch detection signal outputted by corresponding driver module to the n touch electrodes corresponding to the selector module in the step S24, for instance, can be implemented by the following steps S241 and S242.

S241: dividing the second time duration into n periods.

S242: controlling each selector module to transmit the second touch detection signal outputted by corresponding driver module to one touch electrode corresponding to the selector module in each period of the n periods, in which the touch electrodes to which the second touch detection signal is transmitted by the same selector module respectively in the n periods are all different.

That is to say, the step S24 can be implemented by dividing the second time duration within which the driver module outputs the second touch detection signal into the n periods and by controlling the selector module to respectively transmit the second touch detection signal to one different touch electrode at each period.

For instance, in the situation where the touch driving method provided by the embodiments of the present disclosure is used for switching the standby mode into the normal operation mode, the touch driving method provided by at least one embodiment of the present disclosure includes: in the standby mode, controlling the driver module to output the first touch detection signal, and controlling the selector module to simultaneously transmit the first touch detection signal to the n touch electrodes connected with the selector module; and in the normal operation mode, controlling the driver module to output the second touch detection signal, and controlling the selector module to successively transmit the second touch detection signal outputted by corresponding driver module to the n touch electrodes corresponding to the selector module.

Figure 6A:
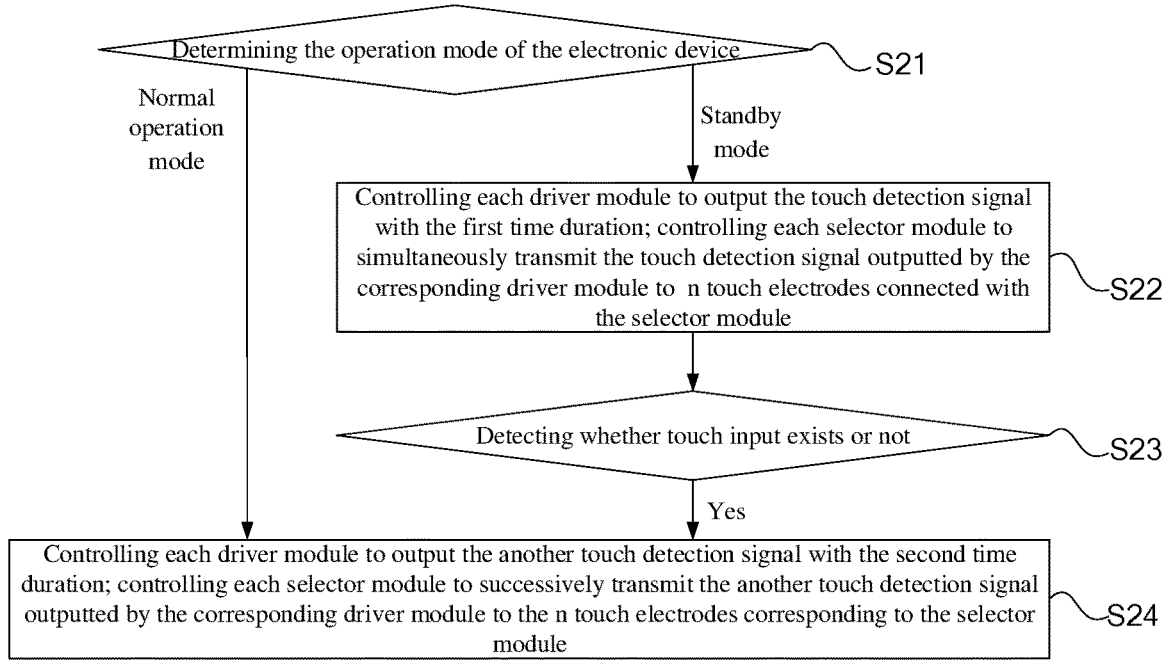
FIG. 6A is a flowchart 3 of the touch driving method provided by the embodiments of the present disclosure.

For instance, as shown in FIG. 6A, the touch driving method provided by the embodiments further includes: directly executing the step S24 in the situation where the operation mode of the electronic device is determined to be the normal operation mode in the step S21. That is to say, in the case of determining the operation mode of the electronic device as the normal operation mode, each driver module is controlled to output the second touch detection signal, and each selector module is controlled to successively transmit the second touch detection signal outputted by corresponding driver module to the n touch electrodes corresponding to the selector module.

It should be noted that in the embodiment as shown in FIG. 6A, in the situation where the electronic device is determined to be in the normal operation mode, an input mode of a scanning signal is controlled to be the same with an input mode of the scanning signal in the standby state of the electronic device and in presence of the detection result that the touch input exists, so the embodiment can also be implemented by the implementation as shown in FIG. 5.

For instance, in the situation where the touch driving method provided by the embodiments of the present disclosure is used for switching the display mode into the touch display mode, the touch driving method provided by at least one embodiment of the present disclosure includes: controlling the normal operation mode to include the display mode and the touch display mode; allowing the display mode to include the controlling the driver module to output the first touch detection signal and the controlling the selector module to simultaneously transmit the first touch detection signal to the n touch electrodes connected with the selector module; and allowing the touch display mode to include the controlling the driver module to output the second touch detection signal and the controlling the selector module to successively transmit the second touch detection signal outputted by corresponding driver module to the n touch electrodes corresponding to the selector module.

Figure 6B:
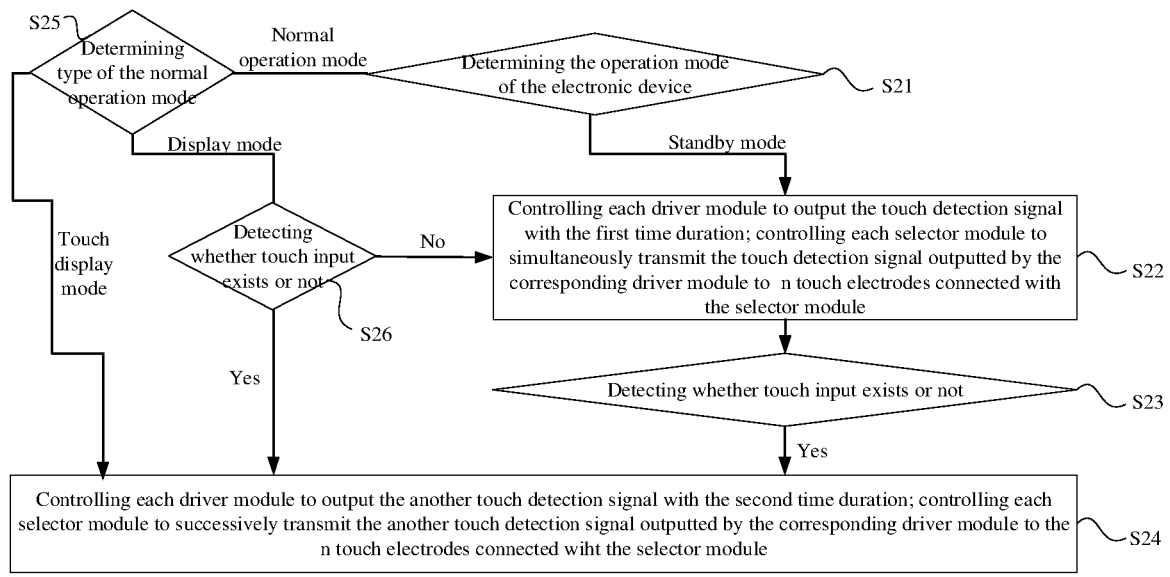
FIG. 6B is a flowchart 4 of the touch driving method provided by the embodiments of the present disclosure.

For instance, in the situation where the touch driving method provided by the embodiments of the present disclosure is used for switching the display mode into the touch display mode, as shown in FIG. 6B, the touch driving method provided by at least one embodiment of the present disclosure further includes the following steps.

S25: determining the type of the normal operation mode under the normal operation mode.

In the step S25, if the normal operation mode is determined to be the touch display mode, the step S24 is executed.

In the step S25, if the normal operation mode is determined to be the display mode, the step S6 is executed: detecting whether the touch input exists or not. In presence of the detection result that the touch input exists, the step S24 is executed; and in the case of a detection result of no touch input, the step S22 is executed.

For instance, in the situation where the driver module outputs the first touch signal with the first time duration, a voltage of the first touch detection signal is a first voltage; in the situation where the driver module outputs the second touch detection signal with the second time duration, a voltage of the second touch detection signal is a second voltage; and the first voltage is less than the second voltage. That is to say, the voltage of the first touch detection signal in the case of controlling each selector module to simultaneously transmit the first touch detection signal to the touch electrodes is less than the voltage of the second touch detection signal in the case of controlling each selector module to successively transmit the second touch detection signal to the touch electrodes.

Because the selector module makes the touch electrodes electrically connected with each other in the situation where the selector module simultaneously transmits the first touch detection signal to the touch electrodes, an area of the touch electrodes is increased, and then the capacitance of the touch electrodes is increased, and thus the voltage inputted into the touch electrodes can be reduced at this point. Because the embodiments of the present disclosure can reduce the value of the voltage of the first touch detection signal, the power consumption of the electronic device can be further reduced.

The embodiments of the present disclosure provides the touch driver device corresponding to the touch driving method provided by the above embodiments. Similarly, the touch driver device provided by the embodiments of the present disclosure is used for the touch driving of the electronic device. The electronic device includes: the m driver modules, the m selector modules and the plurality of touch electrodes; the m driver modules are connected with the m selector modules in one-to-one correspondence; and each selector module corresponds to n touch electrodes, in which m and n are integers and n>1, m>1.

It should be also noted that the explanations in the embodiments of the above touch driving method can be cited to explain the touch driver device provided by the embodiments of the present disclosure. Therefore, the content described in the above method embodiments will not be further described in the embodiments of the present disclosure.

Figure 7:
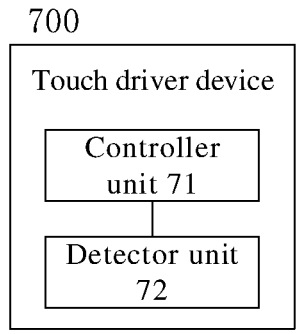
FIG. 7 is a schematic structural view of a touch driver device provided by the embodiments of the present disclosure.

For instance, as shown in FIG. 7, the touch driver device 700 provided by the embodiments of the present disclosure includes a touch controller unit 71 and a detector unit 72.

The controller unit 71 is configured to, in presence of a determination that the electronic device is in the first touch mode, control each driver module to output the first touch detection signal with the first time duration, and control each selector module to simultaneously transmit the first touch detection signal outputted by corresponding driver module to the n touch electrodes connected with the selector module.

The detector unit 72 is configured to detect whether the touch input exists or not.

In the situation where the detector unit detects the touch input to exist, the controller unit 71 is also configured to control each driver module to output the second touch detection signal with the second time duration, and control each selector module to successively transmit the second touch detection signal outputted by corresponding driver module to the n touch electrodes corresponding to the selector module, in which the first time duration is less than the second time duration.

In the touch driver device provided by the embodiments of the present disclosure, in the situation where it is determined that the electronic device is in the first touch mode (for instance, the standby mode or the display mode in the normal operation mode), each driver module is controlled to output the first touch detection signal with the first time duration; each selector module is controlled to simultaneously transmit the first touch detection signal outputted by corresponding driver module to the n touch electrodes connected with the selector module, whether the touch input exists or not is detected through the detector unit, and in presence of the detection result that the touch input exists, the controller unit controls each driver module to output the second touch detection signal with the second time duration and controls each selector module to successively transmit the second touch detection signal outputted by corresponding driver module to the n touch electrodes corresponding to the selector module. In the touch driver device provided by the embodiments of the present disclosure, each driver module is controlled to output the first touch detection signal with the first time duration in the first touch mode and in the case of no touch input, and each driver module is controlled to output the second touch detection signal with the second time duration in presence of the touch input, and the first time duration is less than the second time duration. Therefore, the embodiments of the present disclosure can shorten the time duration within which the driver module outputs the first touch detection signal in the first touch mode and in the case of no touch input, and then reduce the power consumption of the electronic device.

For instance, the controller unit 71 is configured to divide the second time duration into the n periods, and control each selector module to transmit the second touch detection signal outputted by corresponding driver module to one touch electrode connected with the selector module in one period, and the touch electrodes to which the second touch detection signal is transmitted by the same selector module respectively in the n periods are all different.

For instance, the controller unit 71 is also configured to control each driver module to output the second touch detection signal with the second time duration in the situation where the electronic device is determined to be in the normal operation mode; and control each selector module to successively transmit the second touch detection signal outputted by corresponding driver module to the n touch electrodes corresponding to the selector module.

For instance, in the situation where the driver module outputs the first touch detection signal with the first time duration, the voltage of the first touch detection signal is the first voltage; in the situation where the driver module outputs the second touch detection signal with the second time duration, the voltage of the second touch detection signal is the second voltage; and the first voltage is less than the second voltage.

For instance, the driver module is the active front end; and the selector module is the multiplexer.

For instance, the controller unit and the detector unit may be a general-purpose processor (GPP), a digital signal processor (DSP), an application-specific integrated circuit (ASIC), a field programmable gate array (FPGA) or other programmable logic device, a discrete gate, a transistor logic device, a discrete hardware component, etc. The general-purpose processor may be a microprocessor or any conventional processor.

In addition, the controller unit and the detector unit can be both integrated into one processor or respectively implemented by different processors; and the touch controller unit and the detector unit not only can be implemented in the form of hardware but also can be implemented in the form of hardware plus software functional units.

At least one embodiment of the present disclosure provides the operation mode switching method, which includes: in the first operation mode, simultaneously transmitting the first touch detection signal to the n touch electrodes connected with the selector module (namely the first operation mode adopts the first touch mode), in which n>1 and n is an integer; and switching the first operation mode to the second operation mode in presence of the detection result that the touch input exists. In the embodiment of the present disclosure, because the first touch detection signal is simultaneously transmitted to the n touch electrodes connected with the same selector module, the power consumption of the touch circuit under the first operation mode can be reduced.

For instance, in the second operation mode, the selector module is controlled to successively transmit the second touch detection signal to the n touch electrodes (namely the second operation mode adopts the second touch mode).

For instance, the switching method provided by the embodiments of the present disclosure further includes: in the first operation mode, controlling the driver module to transmit the first touch detection signal to the selector module; and in the second operation mode, controlling the driver module to transmit the second touch detection signal to the selector module.

For instance, in some embodiments of the present disclosure, the m driver modules and the m selector modules may be included. The arrangement mode of the m driver modules, the m selector modules and the m*n touch electrodes may refer to the relevant description in the embodiments of the touch driving method. No further description will be given here.

For instance, the first touch detection signal has the first time duration; the second touch detection signal has the second time duration; and the first time duration is less than the second time duration.

For instance, the first touch detection signal has the first voltage; the second touch detection signal has the second voltage; and the first voltage is less than the second voltage.

At least one embodiment of the present disclosure further provides the touch device. As shown in FIG. 1, the touch device includes the m driver modules 11, the m selector modules 12 and the plurality of touch electrodes 13; the m driver modules 11 and the m selector modules 12 are connected with each other in one-to-one correspondence; each selector module 12 includes n electrical connection paths 120; the n electrical connection paths 120 respectively correspond to n touch electrodes 13 among the plurality of touch electrodes 13; and the n touch electrodes 13 are arranged in the same column and respectively disposed in different rows (for instance, the plurality of touch electrodes 13 are arranged in m columns and n rows), in which both m and n are an integer and greater than 1.

Figure 8:
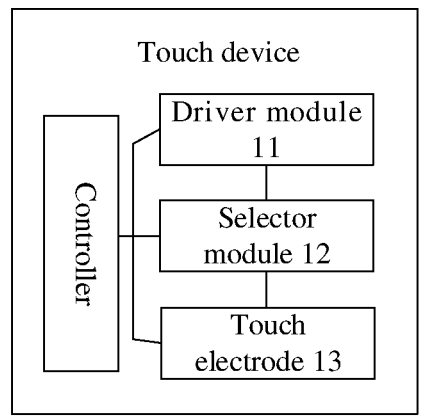
FIG. 8 is a schematic structural view of a touch device provided by the embodiments of the present disclosure.

For instance, as shown in FIG. 8, the touch device provided by at least one embodiment of the present disclosure further includes a controller, which is configured to: in the first touch mode, allowing each selector module 12 to be electrically connected with the n touch electrodes 13 respectively through the n electrical connection paths; and in the second touch mode, allowing each selector module 12 to be electrically connected with one of the n touch electrodes 13 through one of the n electrical connection paths (FIG. 4 only shows one electrical connection path as an example).

For instance, in the first touch mode, the first touch detection signal transmitted to the touch electrode 13 has the first time duration; in the second touch mode, the second touch detection signal transmitted to the touch electrode 13 has the second time duration; and the first time duration is less than the second time duration.

For instance, the first touch detection signal has the first voltage; the second touch detection signal has the second voltage; and the first voltage is less than the second voltage.

For instance, the controller may be a general-purpose processor, a digital signal processor (DSP), an application-specific integrated circuit (ASIC), a field programmable gate array (FPGA) or other programmable logic device, a discrete gate, a transistor logic device, a discrete hardware component, etc. The general-purpose processor may be a microprocessor or any conventional processor.

Still another embodiment of the present disclosure provides the electronic device, which includes the touch device or the touch driver device provided by any foregoing embodiment and/or is driven by the touch driving method provided by any foregoing embodiment.

For example, the electronic device in the embodiments of the present disclosure may be: a liquid crystal display panel, an OLED display panel, an electronic paper, a mobile phone, a tablet computer, a television, a display, a notebook computer, a digital photo frame, a navigator product, or a component.

The parts of the same name and their setting manners in the embodiments of the touch driving method, the touch driver device, the operation mode switching method, the touch device and the electronic device provided by the embodiments of the present disclosure can be referred to each other.

What are described above is related to the illustrative embodiments of the disclosure only and not limitative to the scope of the disclosure; the scopes of the disclosure are defined by the accompanying claims.

What is claimed is:
1. A touch driving method, comprising:
controlling a driver module to output a first touch detection signal;
controlling a selector module connected with the driver module to simultaneously transmit the first touch detection signal outputted by the driver module to n touch electrodes connected with the selector module, so as to simultaneously detect variation of signals of the n touch electrodes through an identical detection wire connected to the n touch electrodes, wherein n is an integer, n>1, and the selector module is connected between the driver module and the n touch electrodes;
detecting whether touch input exists on the n touch electrodes or not by simultaneously detecting the variation of the signals of the n touch electrodes;
in presence of a detection result that the touch input exists, controlling the driver module to output a second touch detection signal, and controlling the selector module to successively transmit the second touch detection signal outputted by the driver module to the n touch electrodes;

controlling a normal operation mode to comprise a display mode and a touch display mode;
allowing the display mode to comprise the controlling the driver module to output the first touch detection signal and the controlling the selector module to simultaneously transmit the first touch detection signal to the n touch electrodes connected with the selector module; and
allowing the touch display mode to comprise the controlling the driver module to output the second touch detection signal and the controlling the selector module to successively transmit the second touch detection signal outputted by the driver module corresponding to the selector module to the n touch electrodes corresponding to the selector module.

2. The touch driving method according to claim 1, wherein
each driver module of m driver modules is controlled to output the first touch detection signal;
each selector module of m selector modules connected with the m driver modules in one-to-one correspondence is controlled to simultaneously transmit the first touch detection signal outputted by a corresponding one of the m driver modules to the n touch electrodes connected with the selector module, wherein m is an integer and m>1; and
in presence of the detection result that the touch input exists, each driver module of the m driver modules is controlled to output the second touch detection signal, and each selector module is controlled to successively transmit the second touch detection signal outputted by the corresponding one of the m driver modules to the n touch electrodes corresponding to the selector module.

3. The touch driving method according to claim 2, wherein the n touch electrodes connected with a same one of the selector modules are arranged in a same column and respectively arranged in different rows.

4. The touch driving method according to claim 3, wherein
the m selector modules are simultaneously controlled to respectively transmit the first touch detection signal to the touch electrodes that the m selector modules correspond to; and
in presence of the detection result that the touch input exists, the m selector modules are simultaneously controlled to respectively and successively transmit the second touch detection signal to the touch electrodes that the m selector modules correspond to.

5. The touch driving method according to claim 1, wherein
a time duration within which the driver module outputs the first touch detection signal is a first time duration;
a time duration within which the driver module outputs the second touch detection signal is a second time duration, and the first time duration is less than the second time duration.

6. The touch driving method according to claim 5, wherein
the second time duration is divided into n periods;
the selector module is controlled to transmit the second touch detection signal outputted by the driver module corresponding to the selector module to one of the n touch electrodes corresponding to the selector module in each one of the n periods, and the touch electrodes to which the selector module transmits the second touch detection signal respectively in the n periods are different.

7. The touch driving method according to claim 5, wherein
the driver module outputs the first touch detection signal with the first time duration, and a voltage of the first touch detection signal is a first voltage;
the driver module outputs the second touch detection signal with the second time duration, and a voltage of the second touch detection signal is a second voltage; and
the first voltage is less than the second voltage.

8. The touch driving method according to claim 1, wherein in a standby mode, the driver module is controlled to output the first touch detection signal, and the selector module is controlled to simultaneously transmit the first touch detection signal to the n touch electrodes connected with the selector module.

9. The touch driving method according to claim 8, wherein
in a normal operation mode, the driver module is controlled to output the second touch detection signal, and the selector module is controlled to successively transmit the second touch detection signal outputted by the driver module corresponding to the selector module to the n touch electrodes corresponding to the selector module.

10. An operation mode switching method, comprising:
in a first operation mode, simultaneously transmitting a first touch detection signal to n touch electrodes connected with a selector module to simultaneously detect variation of signals of the n touch electrodes through an identical detection wire connected to the n touch electrodes, wherein n is an integer, n>1, the selector module is connected between a driver module and the n touch electrodes, and the driver module is controlled to output the first touch detection signal;
in presence of a detection result that touch input exists on the n touch electrodes, switching to a second operation mode different from the first operation mode;
controlling a normal operation mode to comprise a display mode and a touch display mode;
allowing the display mode to comprise the simultaneously transmitting the first touch detection signal to the n touch electrodes connected with the selector module to simultaneously detect the variation of signals of the n touch electrodes through the identical detection wire connected to the n touch electrodes; and
allowing the touch display mode to comprise the switching to the second operation mode different from the first operation mode, wherein in the second operation mode, the selector module is controlled to successively transmit a second touch detection signal to the n touch electrodes, and the driver module is controlled to output the second touch detection signal.

11. A touch driver device, comprising:
a driver module;
a selector module connected with the driver module;
n touch electrodes connected with the selector module, wherein n is an integer, n>1, and the selector module is connected between the driver module and the n touch electrodes;
a controller unit configured to control the driver module to output a first touch detection signal and control the selector module connected with the driver module to simultaneously transmit the first touch detection signal outputted by the driver module corresponding to the selector module to the n touch electrodes connected with the selector module; and a detector unit configured to detect whether touch input exists on the n touch electrodes or not by simultaneously detecting variation of signals of the n touch electrodes through an identical detection wire connected to the n touch electrodes, wherein in presence of a detection result of the detector unit being that the touch input exists, the controller unit is further configured to control the driver module to output a second touch detection signal and control the selector module to successively transmit the second touch detection signal outputted by the driver module corresponding to the selector module to the n touch electrodes corresponding to the selector module; and the controller unit is further configured to control a normal operation mode to comprise a display mode and a touch display mode, wherein in the display mode, the controller unit is configured to control the driver module to output the first touch detection signal and control the selector module to simultaneously transmit the first touch detection signal to the n touch electrodes connected with the selector module; and in the touch display mode, the controller unit is configured to control the driver module to output the second touch detection signal and control the selector module to successively transmit the second touch detection signal outputted by the driver module corresponding to the selector module to the n touch electrodes corresponding to the selector module.

12. The touch driver device according to claim 11, wherein a time duration within which the driver module outputs the first touch detection signal is a first time duration;

a time duration within which the driver module outputs the second touch detection signal is a second time duration; and the first time duration is less than the second time duration.

13. The touch driver device according to claim 12, wherein the controller unit is configured to:

divide the second time duration into n periods; and control the selector module to transmit the second touch detection signal outputted by the driver module corresponding to the selector module to one of the n touch electrodes connected with the selector module in each of the n period, wherein the touch electrodes to which the selector module transmits the second touch detection signal respectively in the n periods are different.

14. The touch driver device according to claim 11, wherein the controller unit is further configured to control the driver module to output the second touch detection signal and control the selector module to successively transmit the second touch detection signal outputted by the driver module corresponding to the selector module to the n touch electrodes corresponding to the selector module, in the normal operation mode.

15. The touch driver device according to claim 12, wherein the driver module outputs the first touch detection signal with the first time duration, and a voltage of the first touch detection signal is a first voltage;

the driver module outputs the second touch detection signal with the second time duration, and a voltage of the second touch detection signal is a second voltage; and the first voltage is less than the second voltage.

16. The touch driver device according to claim 12, wherein the driver module is an active front end; and the selector module is a multiplexer.

17. An electronic device, comprising the touch driver device according to claim 11.

18. A touch device, comprising the touch driver device according to claim 11, wherein the touch device comprises m driver modules, m selector modules and a plurality of touch electrodes, wherein the m driver modules are connected with the m selector modules in one-to-one correspondence;

each selector module among the m selector modules comprises n electrical connection paths, the n electrical connection paths respectively correspond to n touch electrodes among the plurality of touch electrodes, the n touch electrodes are arranged in a same column and respectively disposed in different rows; and both m and n are an integer and greater than 1.

* * * * *